United States Patent Office
3,382,217
Patented May 7, 1968

3,382,217
POLYESTER-ETHER THERMOPLASTIC
RESIN COMPOSITIONS
Leslie C. Case, 14 Lockeland Road,
Winchester, Mass. 01890
No Drawing. Continuation-in-part of application Ser. No.
336,067, Jan. 6, 1964. This application Feb. 4, 1966,
Ser. No. 525,128
18 Claims. (Cl. 260—78.4)

ABSTRACT OF THE DISCLOSURE

Novel polyester-polyether copolymers having polyether segments of variable length between ester linkages are prepared by reacting together (1) a monoepoxide or a monooxetane, (2) a cyclic monoanhydride of an organic dicarboxylic acid, (3) a polymerization starter having at least one active-hydrogen-containing radical selected from the group consisting of hydroxyl, carboxyl, or sulfhydryl radicals, and (4) a catalyst selected from among organic esters, carboxylic acid salts and chelates of elements with an electronegativity value ranging from 1.2 to 2.6. The polyether segments between ester linkages have an average of at least 2.5 cyclic monoether residues. The preferred catalysts for this reaction are the organic acid salts and acetylacetonates of tin, nickel, vanadium, cobalt and zinc, and the alcoholates and acetylacetonates of aluminum, titanium, zirconium, boron and antimony.

---

This application is a continuation-in-part of my copending application Ser. No. 336,067, filed Jan. 6, 1964, now abandoned.

This invention relates to the production of thermoplastic resin compositions. More specifically this invention is concerned with the novel catalytic production of fusible, soluble, thermoplastic polyether-ester copolymer compositions. In a still more specific aspect this invention is concerned with thermoplastic polyether-ester copolymer compositions having polyoxyalkylene segments of extended length, and in particular having long terminal polyether tails.

Applications Ser. No. 168,062, filed Jan. 23, 1962, now abandoned, and Ser. No. 456,816, filed May 18, 1965 by Leslie C. Case and Laura K. Case describe the production of novel, fusible, soluble, thermoplastic random polyether-ester copolymers useful in a number of applications such as polymeric plasticizers, as components in the production of foams, coatings, castings and in laminated products. These copolymers are prepared by copolymerizing at elevated temperatures and superatmospheric pressures cyclic dicarboxylic acid monoanhydrides and cyclic monoethers having oxygen located in a heterocyclic ring of three or four members, in the presence of a polymerization starter selected from the group consisting of water, inorganic acids, organic carboxylic acids and organic compounds having hydroxyl and sulfhydryl substituents.

The rate of copolymerization was found to be autocatalytic if acids of sufficient strength, or their anhydrides, were used as reactants, but it was significantly slower with reactants which did not exert this autocatalytic effect, necessitating longer reaction times and higher reaction temperatures. Shorter reaction periods and lower operating temperatures and pressures would constitute very desirable improvements for those polymerizations which normally proceed at a slower rate. Such an improvement would be particularly valuable for large-scale commercial operation, since it would result in significant savings in cost of operating labor and capital equipment investment.

These random polyether-ester compositions consist of linear polymer chains attached through ester and ether linkages to a polymerization starter residue, with the polymer chains being essentially composed of polyoxyalkylene ether segments of the general structural formula —(O—R)—$_n$ and ester units of the formula

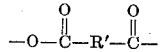

wherein —O—R— is a 1,3-oxyalkylene or 1,4-oxyalkylene radical and is derived from the respective cyclic ether by a ring-opening reaction, $n$ represents the degree of polymerization of the polyoxyalkylene segments and is a positive integer which may vary from one to more than 10 with the average value of $n$ being generally more than 1.5, and

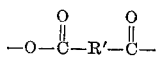

is a radical derived from a cyclic dicarboxylic acid anhydride by a ring-opening reaction. The polymer chains may carry terminal hydroxyl groups or terminal carboxylic acid groups and the polymer may be mono- or poly-functional. The viscosity characteristics of these copolymeric compositions depend significantly on the average degree of polymerization of the polyoxyalkylene ether segments, with the viscosity generally decreasing as the average degree of polymerization in the polyether segments increases. The kinetic relationships of the copolymerization appeared to be such that the conversion of cyclic ether decreased considerably after a normal, readily-combinable amount had reacted and the average degree of polymerization in the polyether segments could only be increased somewhat above normal readily-obtainable values through the use of amounts of cyclic ether greatly in excess over those chemically combined. The use of such large excess amounts of cyclic ether is disadvantageous since it entails larger reaction volumes, higher operating pressures and requires for economical operation recovery or recycling of the unused portion of cyclic ether.

Since the utility of these compositions as polymeric intermediates and components in such areas as polyurethanes or laminates depends significantly on their viscosity characteristics a process improvement which would readily and conveniently achieve an increase in the degree of polymerization of the polyoxyalkylene units, e.g. the length of the polyether segments of these copolymers would be highly desirable.

The art describes the catalytic production of ordinary polyesters by the reaction of epoxides and anhydrides in the presence of catalytic amounts of hydroxides, alkoxides and salts of alkali metal ions, alkaline earth metal ions or quaternary ammonium ions. When I attempted to use these catalysts in the preparation of our random polyester-ether copolymers (see Example I) I found that the course of the polymerization was altered in the presence of these substances. I also found that the reaction was heterogeneous and required inordinately long reaction times before a high-molecular-weight polymer could be isolated. Specifically I recovered after a very long reaction time large amounts of unreacted epoxide and a viscous or glassy polymer which seemed to be an essentially pure, ordinary polyester in which the degree of polymerization of the oxalkylene units was about one. I further observed that when relatively high-melting anhydrides, such as phthalic anhydride, were used together with such catalysts the polymer formation proceeded only incompletely and did not yield any useful compositions.

It is a primary object of this invention to provide an improved method for the production of polyether-ester copolymers at lower temperatures and pressures and in less time. Another main object of this invention is to provide an improved process for preparing random polyether-ester copolymers in which the average degree of polymerization of the polyoxyalkylene ether segments is greater than about 2.5. It is yet another principal object of this invention to furnish novel, soluble, fusible, thermoplastic polyether-ester copolymers having terminal polyoxyalkylene ether segments of substantial length and to provide methods for preparing such compositions. These and other objectives of the invention will be apparent from the following detailed description thereof.

I have found that these objectives may be accomplished through the use of selected catalysts for the copolymerization reaction.

The catalysts which I have discovered to be effective for increasing the rate of the copolymerization may conveniently be described as comprising the group consisting of organic derivatives of elements having an electronegativity value falling within the range of at least about 1.2 up to and generally not more than 2.6, such as titanium, vanadium, tin, chromium, manganese, iron, cobalt, nickel, boron, aluminum, copper, zinc, zirconium, niobium, lead, molybdenum, tantalum, antimony, arsenic, and tungsten, in which said element is bound by means of oxygen to the organic residue either through covalent bonding or through ionic bonding or through bonding commonly referred to as chelation, said organic residue being derived from a member of the group consisting of organic compounds having one or more hydroxyl radicals, carboxyl radicals, or carbonyl radicals. The term electronegativity and the electronegativity values as used herein are those described and defined by L. Pauling in "The Nature of the Chemical Bond," Cornell University Press, Ithaca, N.Y. For the purposes of this invention it is desirable to take the electronegativity of the element as that exhibited in an oxygen-element bond. It should be emphasized that the elements which I have found useful comprise the classes consisting of transition elements and of elements with amphoteric character. Useful catalysts thus comprise alkoxides, acylates and chelates of these elements. It should be understood of course that some of the elements listed above are incapable of forming all three types of organic derivatives and are therefore available perhaps only as acylates, or perhaps only as chelates, or only as alkoxides.

The addition of the above-described catalysts to the reaction mixture comprised of the cyclic monoanhydride, the cyclic monoether and the polymerization starter results in a marked increase in the rate of polymerization. I have found that in the presence of these catalysts the copolymerization proceeds to completion in less time, at significantly lower temperatures, than heretofore known. Since the operating pressure has to be equal to at least the vapor pressure of the reaction mixture at the operating temperature, and since this vapor pressure decreases with decreasing reaction temperature, the pressure requirements are also lowered. Lower pressure requirements are of considerable advantage in reducing the cost of equipment and in facilitating operations. In addition the shorter reaction periods and lower reaction temperatures result in polymer compositions with improved color.

The catalysts which I have found useful and effective for increasing the rate of polymerization comprise the following classes:

(1) Organic esters or partial esters derived from compounds containing one or more hydroxyl groups and the aforementioned elements, and having the structural formula: $(R_1O)_nE$ where E is an element having an electronegativity value of at least about 1.3 and generally not more than about 2.3, $n$ is an integer, such as 1, 2, 3, 4, etc., corresponding to the valence state of the element, and R is a radical selected from the group consisting of hydrogen, alkyl, alkylene, cycloalkyl, cycloalkylene, aryl, arylene, aralkyl, alkaryl, and heteroaryl radicals. The radicals may be saturated or unsaturated and they may be linear or branched, and they may carry substituents such as alkoyl, halogen, and the like. Examples of suitable radicals are methyl, ethyl, ethylene, propyl, propylene, isopropyl, isopropylene, n-butyl, sec-butyl, octyl, lauryl, vinyl, allyl, dodecenyl, stearyl vinylene, naphthyl, phenyl, phenylene, tolyl, xylyl, benzyl, furoyl, and others. In a given activating compound all the radicals may be the same or two or more different radicals may be present. The preferred catalysts of this type are those in which $R_1$ is a saturated aliphatic hydrocarbon radical having from one to 18 carbon atoms and E is selected from the group consisting of titanium, aluminum, boron and zirconium.

(2) Salts of carboxylic acids or covalent acyloxy-derivatives of the aforementioned elements which possess at least one, and preferably more, acyl groups, e.g. groups having the structural formula:

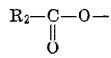

The carboxylic acids used in the formation of these derivatives may be monofunctional or polyfunctional, and they may be saturated, unsaturated, aliphatic, cycloaliphatic, aromatic, or heterocyclic. They may be substituted with radicals such as alkoxy, halogen, and the like. In a given activating compound the acyl groups may be the same or two or more different acyl groups may be present.

The preferred catalysts of this type are those having the general structural formula

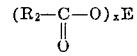

wherein $R_2$ is an aliphatic hydrocarbon radical having from one to 53 carbon atoms, and E is selected from the group consisting of tin, cobalt, iron, aluminum, zinc, boron, and nickel.

(3) Organic compounds generally referred to as chelates and having, among others, such structural formulas as the types:

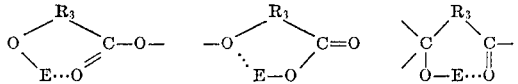

wherein $R_3$ is an organic residue and E is an element having an electronegativity of at least 1.2 and generally not more than 2.6. The residue $R_3$ may be saturated, unsaturated, aliphatic, cycloaliphatic, aromatic, or heterocyclic, and may carry other substituents such as halogen, alkoxy, and the like. Useful chelates are those derived from 1,3-diketones such as, among others, acetyl acetone, benzoyl acetone, dipropionyl methane, dibenzoyl methane, 2-furoyl-benzoyl methane, 2-thenoyl acetone, and tri- and hexafluoroacetyl acetone; from hydroxy-acids, such as for example, salicylic acid, citric acid, gluconic acid, lactic acid, malic acid, β-hydroxybutyric acid; from β-keto acids, such as pyruvic acid; and from β-hydroxyaldehydes, such as salicyl aldehyde. Other organic chelating agents in combination with the elements described in this invention may also be employed as activating compounds.

The preferred catalysts of this type are those in which $R_3$ is derived from citric acid, salicylic acid and acetonylacetone and acetylacetone and E is selected from the group consisting of aluminum, titanium, zinc, zirconium, cobalt, and nickel and vanadium.

Examples of useful catalysts comprise members of the group of esters consisting of borates, boronates, titanates, aluminates, zirconates, and stannates. Some examples are: trimethyl borate, triethyl borate, triallyl borate, triphenyl borate, tritolyl borate, tetramethyl titanate, tetraethyl titanate, tetraisopropyl titanate, tetrabutyl titanate, tetraoctylene titanate, tetrastearyl titanate, di-octylene glycol titanate, tetraethyl zirconate, tetraallyl zirconate, tetrapropylzirconate, tetrabutyl zirconate, and triisopropyl aluminate. Organic ester derived from polyfunctional alcohols, such as ethylene glycol, or polyfunctional phenols, such as catechol, are also useful. Such commercially available mixtures, as partially polymerized butyl titanate, are also useful.

Representative of the activating compounds derived from carboxylic acids are, among others, acetates, propionates, butyrates, octoates, mono-, di-, and tri-alkyloctoates, tallates, naphthenates, stearates, laurates, mono-, di-, and tri-alkyllaurates, and linoleates. Examples of such activating compounds are: triacetyl borate, aluminum acetate, stannous octoate, zinc octoate, cobalt octoate, dibutyltin dilaurate, manganese stearate, ferric stearate, aluminum stearate, poly(hydroxy-titanium stearate), stannous tallate, stannous oleate, ferric naphthenate, lead naphthenate, copper naphthenate, and stannous linoleate.

Examples of chelates which I have found very effective as catalysts are zirconium acetylacetonate, titanium acetylacetonate, tin acetylacetonate, copper acetylacetonate, titanium lactate, titanium trifluoroacetylacetonate, and aluminum salicylate.

Thus, there exists a great diversity of such organic derivatives which may satisfactorily serve as catalysts. Not only can many different elements serve as the central core in a given catalyst such as for example tetraisopropyl titanate, tetraisopropyl zirconate, triisopropyl aluminate, and triisopropyl borate, but many different derivatives of each element can also satisfactorily be employed as catalysts, such as for example, tetrabutyl titanate, tetraisopropyl titanate, titanium stearate, titanium lactate, titanium acetylacetonate, and so forth.

It should be emphasized that in determining the activity the selection of the proper element is generally more important than the particular type of organic derivative in which this element is employed, the latter choice being governed chiefly by solubility considerations, availability, cost and the absence of undesirable color characteristics. It is naturally quite desirable to have a liquid catalyst which may be readily mixed with one or both components of the reaction mixture. Similarly, low-melting and readily soluble solids are also quite desirable, whereas high-melting solids are frequently less desirable, and sometimes even unusable.

The catalysts are generally added in the form of the compounds described herein. However, it may sometimes be desirable to prepare the catalyst in situ. For example, a stannous salt of an organic acid which is to be used as the catalyst may be prepared in situ by reaction of added stannous oxide together with added carboxylic acid or anhydride thereof. Again, acetyl borate may be the desired catalyst, and it can be formed by the reaction in situ of fused boric acid and acetic anhydride. Many other such embodiments are possible and useful.

Elements which I have found to be particularly valuable in catalysts are boron, aluminum, cobalt, titanium, zinc, and tin. Specifically preferred are the lower alcoholates of boron, aluminum, and titanium, and the boron, cobalt, aluminum, zinc, and tin derivatives of fatty acids. Particularly useful are trimethyl borate, tri-isopropyl aluminate, tetraisopropyl titanate, zinc octoate, triacetyl borate, cobalt octoate, and stannous octoate, all of which are strong catalysts, readily available, and relatively cheap.

The choice of catalyst to be employed may also be influenced by the prospective end use of the polyester-ether copolymer. For example, the use of catalysts derived from unsaturated organic compounds, such as allyl esters and linoleates, is especially valuable if the polyether-ester copolymer is intended for further use as a component in the preparation of tough, flexible castings and laminates by copolymerization with ethylenically unsaturated monomers capable of polymerization by free-radical initiation as described in our copending application Ser. No. 195,999 filed May 18, 1962 now abandoned, or if the polyether-ester copolymer is used to prepare air-drying resin compositions as described in our copending application Ser. No. 241,061, filed Nov. 29, 1962 now abandoned. Catalysts containing tin, such as stannous octoate and dibutyltin dilaurate, are particularly advantageous for the production of hydroxy-terminated polyether-ester copolymers, which are to be used as components for the preparation of polyurethanes, as described in the copending application Ser. No. 188,842 now abandoned. Not only do these tin catalysts provide significant catalytic rate acceleration in the polymerization process of the present invention, but, as is well known to the art, they are also widely used as catalysts in the preparation of polyurethanes. Thus since these same compounds serve as catalysts in both of these two entirely distinct reactions, the same catalyst can serve a dual function without duplication in cost.

To produce the random polyether-ester copolymers by the process of this invention the copolymerization is effected by reacting together in intimate admixture (1) a cyclic monoether selected from the group consisting of monoepoxides, particularly terminal lower aliphatic epoxides, and monooxetanes (2) a cyclic monoanhydride of an organic dicarboxylic acid, (3) a polymerization starter of the group consisting of water, monomeric inorganic phosphorous-containing acids and organic compounds having at least one radical selected from the group consisting of hydroxyl, carboxyl, and sulfhydryl radicals and mixtures thereof, and (4) one of the aforementioned catalysts at a temperature of about 30° C. to 200° C., and preferably at a temperature of about 75° C. to 150° C. and at a pressure at least equal to the vapor pressure of the system at the reaction temperature. Usually the reaction is conducted at superatmospheric pressure.

The reactions taking place during the copolymerization are complex. The polyether-ester copolymer chains result from random stepwise ring-opening heteroadditions of the cyclic monoanhydride and the cyclic monoether to form ester units and from the homoaddition of the cyclic monoether to itself to form polyether segments of varying length incorporated between ester linkages. Many of the catalysts which I have found to be effective for increasing the copolymerization rate apparently catalyse the rate of polyester formation and polyether formation to about the same extent and result in essentially the same compositions as can be prepared at higher temperatures and pressures in the absence of a catalyst. Quite unexpectedly and surprisingly I discovered, however, that certain compounds which increase the reaction rate also discriminate between ester-forming and ether-forming ring-opening addition reactions and that these compounds are able to exert a catalytic effect of somewhat greater magnitude on the ether formation. Compounds which exhibit this selectivity in their catalytic action will be referred to herein for purposes of the description of the present invention as specific catalysts to distinguish them from the catalysts which merely accelerate the rate of the over-all copolymerization reaction, which latter catalysts shall be designated as non-specific catalysts.

Compounds which I have found to possess this specific catalytic action comprise acylates of tin, zinc, cobalt, nickel, and vanadium of the general formula

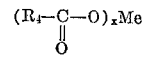

wherein $R_4$ is an aliphatic hydrocarbon radical having from 1 to 53 carbon atoms, Me is selected from the group consisting of tin, zinc, cobalt, nickel and vanadium, and $x$ is a positive integer equal to the valence state of the metal. I have further found that such chelates as, for example, the acetylacetonates of these elements, including those of the VO or vanadyl group are also useful in this respect. Examples of such useful specific catalysts include among others stannous octoate, cobaltous octoate, zinc octoate, zinc acetate, stannous oleate, zinc naphthenate, cobalt naphthenate, vanadium acetylacetonate, nickel acetylacetonate, cobaltous acetylacetonate, cobaltic acetylacetonate, zinc salicylate, and others.

I have found that when these specific catalysts are employed a larger amount of cyclic monoether can be incorporated into the polyether-ester copolymers in comparison to the amount which becomes chemically combined when non-specific catalysts or no catalysts are employed. When these compounds are employed the conversion of the cyclic monoether is increased and the use of very large excess amounts of cyclic monoether becomes unnecessary. These catalysts can thus be advantageously used to prepare polymer compositions which have a larger average degree of polymerization in the polyether segments than that which would be obtained using the same reactant proportions in the absence of these specific catalysts. I have further discovered that these specific catalysts may advantageously be employed to prepare polyether-ester polymer compositions in which the polymer chains have terminal polyether segments of increased length. Such novel compositions have particularly useful viscosity and chemical compatibility properties. Specifically, variations in the mode of addition of these specific catalysts to the reactant mixture enables incorporation of increased amounts of oxyalkylene units in the terminal positions or internally within the polymer chain. If the polymerization starter, the monoanhydride, the entire amount of cyclic monoether and the specific catalyst are combined together and allowed to react, the number of oxyalkylene units in all the polyether chain segments is increased by a random amount. If, however, the specific catalyst is added together with a second excess portion of monoepoxide to a preformed random polyether-ester copolymer, and the mixture reacted, additional oxyalkylene groups are added to the polymer chains in the terminal locations and the resulting polymer composition has terminal hydroxyl-ended polyether chain segments of significant length.

The specific catalysts which are particularly preferred for use in this invention are the carboxylic acid salts of tin, zinc, and cobalt. Particularly preferred are the stannous salts of carboxylic acids having from 2 to 54 carbon atoms.

All of the cyclic polycarboxylic acid monoanhydrides, the difunctionally reactive cyclic monoethers and the polymerization starters described in the copending applications Ser. No. 168,062 and 456,816 are also useful in the present invention. Cyclic monoethers which are useful in the present invention comprise 1,2-alkylene oxides derived from epoxidation of linear aliphatic olefins, hereinafter referred to as linear aliphatic monoepoxides, and 1,3-alkylene oxides hereinafter referred to as monooxetanes. Useful cyclic monoethers should only be difunctionally reactive under the process conditions and should advisably be free from functional substituents which would be reactive under the process conditions and from ethylenic and acetylenic unsaturation when employed together with unsaturated anhydrides. Examples of cyclic monoethers which can be used are epoxides such as ethylene oxide, propylene oxide, 1,2-butylene oxide, styrene oxide, epichlorohydrin and 2,3-butylene oxide, and monooxetanes such as trimethylene oxide, also known as oxetane, 3,3-dimethyl-trimethylene oxide or 3,3-dimethyl oxetane, and 3,3-bis(chloromethyl) oxetane. Mixtures of cyclic monoethers may be used. Particularly useful are linear aliphatic monoepoxides having a terminal epoxy group and having the general structural formula

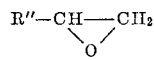

wherein R" can be hydrogen or a radical of not more than 10 and frequently not more than six carbon atoms selected from the group consisting of alkyl and chloroalkyl radicals. In the preferred embodiment of this invention saturated aliphatic terminal monoepoxides having from two to six carbon atoms are employed. The most preferred epoxides are ethylene oxide, 1,2-propylene oxide, and 1,2-butylene oxide. Mixtures of epoxides may be employed.

The cyclic polycarboxylic acid monoanhydrides useful in the present invention can be aromatic, saturated aliphatic, partially saturated aliphatic or cycloaliphatic anhydrides. Cyclic monoanhydrides of dicarboxylic acids having from four to fourteen carbon atoms are especially useful. The anhydrides may be employed singly or mixtures of two or more, as desired, can be used. The preferred anhydrides for use in the present invention are phthalic anhydride, tetrachlorophthalic anhydride, tetrabromophthalic anhydride, tetrahydrophthalic anhydride, 1,4,5,6,7,7-hexachlorobicyclo - (2,2,1) - 5 - heptene-2,3-dicarboxylic acid anhydride (hereinafter referred to as chlorendic anhydride), 2,2'-diphenyl dicarboxylic acid anhydride (hereinafter referred to as diphenic acid anhydride), maleic anhydride, itaconic anhydride, glutaric anhydride, and succinic anhydride.

The process of this invention is valuable in accelerating the polymerization and especially valuable in increasing the average degree of polymerization in the polyether segments without the use of large excess amounts of epoxides with anhydrides such as phthalic anhydride, tetrachlorophthalic anhydride, tetrabromophthalic anhydride, and chlorendic anhydride. The process of the present invention is particularly valuable for use with anhydrides which react relatively slowly in the process described in our copending applications Ser. No. 168,062 and 456,816. The process of the present invention is thus especially useful for aliphatic and cycloaliphatic anhydrides, such as maleic anhydride, chloromaleic anhydride, succinic anhydride, alkenyl- and alkylsuccinic anhydrides, such as dodecenyl-succinic anhydride, glutaric anhydride, itaconic anhydride, tetrahydrophthalic anhydride, hexahydrophathalic anhydride, and endo-cisbicyclo-(2,2,1)-5-heptene-2,3-dicarboxylic acid anhydride (hereinafter referred to as Nadic anhydride).

Since cyclic ethers and cyclic anhydrides do not react with each other to any appreciable extent, a polymerization starter is required. Compounds capable of starting the ring-opening copolymerization are substances which contain one or more radicals selected from the group consisting of hydroxyl, carboxyl and sulfhydryl radicals. In addition to hydroxyl, sulfhydryl and carboxyl groups the polymerization starter may contain other substituents but these substituents should not be reactive with cyclic ethers and cyclic anhydrides under the process conditions. Suitable polymerization starters thus comprise the group consisting of water, alcohols, saccharides, phenols, carboxylic acids, hydroxy-carboxylic acids, thiols, thiophenols, thiolcarboxylic acids, and thioacids. Other useful starters are hydrogen sulfide and monomeric inorganic phosphorous-containing acids, such as phosphoric and phosphorous acids. Preferred organic polymerization starters comprise the group consisting of aliphatic compounds having from one to 54 carbon atoms, and containing at least one radical selected from the group consisting of hydroxyl, carboxyl, and sulfhydryl radicals. Particularly preferred polymerization starters are aliphatic alcohols having from one to 18 carbon atoms and from one to eight hydroxyl groups, such as monoalcohols, diols, ether glycols, triols, tetrols and higher polyols, monosaccharides and their hydrates, and organic carboxylic acids including hydroxy-carboxylic acids having from two to 54 carbon atoms, from one to four carboxyl groups, and from zero to five hydroxy groups. Mixtures of starters may be employed. Aqueous mixtures are particularly valuable in many instances.

Representative alcoholic polymerization starters that can be used are mono- and polyhydroxy-containing alcohols, such as methanol, ethanol, propanol, butanol, stearyl alcohol, benzyl alcohol, ethylene glycol, propylene glycol, butylene glycol, diethylene glycol, triethylene glycol, tetraethylene glycol, dipropylene glycol, dibutylene glycol, tributylene glycol, trimethylolethane, trimethylolpropane, 1,2,6-hexanetriol, triricinolein, pentaerythritol, dipentaerythritol, tripentaerythritol, sorbitol, glycerol, xylitol, mannitol and inositol; saccharides such as glycose (also known as dextrose), alpha-methyl glucoside, ethylene glycol diglucoside, xylose, sucrose, alpha-cyclodextrin, beta-cyclodextrin, gamma-cyclodextrin, and others. Mixtures of alcoholic polymerization starters and water, such as for example aqueous solutions of sorbitol, as well as hydrates, such as lactose hydrate, dextrose hydrate, and raffinose hydrate are also useful.

Examples of useful carboxylic acid and hydroxy-carboxylic acid starters include among others such compounds as acetic acid, propionic acid, maleic acid, fumaric acid, succinic acid, glutaric acid, adipic acid, stearic acid, benzoic acid, isophthalic acid, linoleic acid, linoleic acid dimer, linoleic acid trimer, oleic acid, aconitic acid, tricarballylic acid, pyromellitic acid, hydroxyacetic acid, citric acid, malic acid, tartaric acid, ricinoleic acid, and gluconic acid.

Examples of phenolic hydroxy-containing compounds which may be employed are phenols, having from 6 to 15 carbon atoms and from one to three phenolic hydroxyl groups, such as phenol, cresol, xylenol, resorcinol, catechol, phloroglucinol and 2,2-bis(4-hydroxyphenyl)-propane.

Representative organic sulfhydryl group-containing compounds useful as polymerization starters comprise aliphatic mono- and polythiols, especially alkyl mercaptans containing up to 12 carbon atom, such as ethane thiol, propane thiol, mercapto alkyl carboxylic acids such as alphamercaptoacetic acid, alphamercapto propionic acid, betamercaptopropionic acid, and esters of these acids with organic alcohols.

The copolymerization is effected by bringing the reactants and the catalyst together at elevated temperatures and superatmospheric pressure, advisably in a closed system, in a manner such that a substantial concentration of the monoepoxide is present intimately admixed with the other reactants during the time in which the major part of the reaction takes place. It is a critical requirement for the successful preparation of the polyester-polyether copolymers of this invention that the reactants are combined so that the ratio of equivalents of monoepoxide to the sum of equivalents of acid groups plus one-half the equivalents of anhydride groups in the reaction mixture is at least 0.3 and generally at least 1.0 during the time in which at least 50 percent and generally at least 75 percent of the polymerization takes place. A maximum of 10 equivalents of monoepoxide in this same ratio is generally used, and as much as 50 equivalents of monoepoxide may be used in some instances. For purposes of this invention one equivalent of cyclic ether is taken to be one mol of cyclic ether, and one equivalent of acid or anhydride is taken to be equal to that amount which is required to neutralize one mol of sodium hydroxide, e.g. one equivalent of acid group is equal to one gram mol of carboxylic acid divided by the number of carboxylic acid groups per mol, and one mol of anhydride equal to two equivalents, so that one-half the number of equivalents of anhydride present generally equals the number of mols present. It should be clearly understood that in order to prepare polyester-ether copolymers according to this invention it is absolutely essential that the reactants are combined in such a manner that a substantial epoxide concentration is always present during the time in which the major amount of the polymerization takes place. While it is frequently convenient to combine all the reactants initially before heating the reaction mixture, and while it is advisable that the total amount of the polymerization starter is present at the start of the reaction, it is to be understood that the entire amount of cyclic ether or all of the anhydride does not have to be present at the start of the reaction but that these reactants may be suitably added in a few sizable batch-wise portions during the course of the polymerization. In order to produce the polyester-polyether copolymers of this invention it is an absolutely essential critical requirement, however, to avoid a mode of operation in which the epoxide is added in a large number of small increments, such as in a drop-wise fashion, as such a mode of operation will result in a highly viscous ordinary polyester containing essentially no polyether segments.

In order to realize the advantages which obtain from the process of the present invention it is a further critical requirement that such strongly basic compounds as alkali metal hydroxides, alkaline earth metal hydroxides or quaternary ammonium hydroxides be excluded from the reaction mixture as the presence of such compounds materially affects the course of the polymerization and does not lead to the desired copolymeric compositions.

A temperature of 30° C. or higher is usually used, although a temperature above 200° C. and advisably above 150° C. is generally not required and may lead to adverse results. For many systems suitable temperatures range from about 70° C. to 150° C., and frequently from about 120° C. to 150° C. If saccharides are employed the reaction is desirably conducted within a temperature range of about 120° C. to 150° C. If halogenated anhydrides, such as chlorendic anhydride are used, or a phosphorous-containing acid is used as polymerization starter, temperatures as low as 70° C. will frequently be sufficient. With some reactants the polymerization once in progress may become exothermic enough so as to require cooling to keep the reaction mixture within the desired temperature range.

The process of this invention is advisably conducted in a closed system at superatmospheric pressures, such as autogeneous pressure. A minimum pressure of 1.5 atmospheres is advisably used, and in most cases pressures will vary from at least about 50 pounds per square inch to about 300 pounds per square inch, and frequently will fall within the range of 100–200 p.s.i.g. The polymerization can be effected batch-wise, in a closed vessel, such as an autoclave equipped with agitation, or under continuous conditions in a tubular reactor at elevated temperatures. Because of the acidic nature of the reaction mixture, equipment of sufficient corrosion resistance must be employed. Depending on the reactants, the particular catalyst, temperature and pressure selected, the time required for completion of the polymerization may vary from a few minutes to a few hours.

An excess of cyclic ether over the amount stoichiometrically needed to react with the cyclic anhydride has to be used in the process of this invention. If hydroxyl-terminated polymer compositions are desired the excess amount of cyclic monoether has to be larger than that necessary for preparation of carboxyl-terminated polymer compositions. In general, the mol ratio of cyclic monoether to cyclic monoanhydride is advisably at least 1.50, and for best results advisably at least 2.00, and frequently at least 3.00. This same mol ratio will generally not be more than ten and will seldom be more than fifteen, if random polyether-ester copolymers are prepared. It should be understood that the exact epoxide-to-anhydride requirement will vary in each instance with the particular reactants and reaction conditions employed and the nature of the end groups desired.

The important consideration in determining the amount of starter to be used is the ratio of the polymer equivalent weight desired to the starter equivalent weight. The equivalent weight of the starter is computed by dividing the starter molecular weight by the number of functional groups capable of starting the polymerization reaction. The equivalent weight of the polymer is computed by dividing the polymer molecular weight by the number of polymer chain-end groups. Thus the ratio of the weight of starter used to the total weight of the polymer formed is the same as the ratio of starter equivalent weight to the polymer equivalent weight.

Suitable amounts of polymerization starter employed in the process will range from about 0.1 percent to more than 25 percent by weight of the total amount of reactants. In general, larger amounts of higher-molecular-weight starting materials are used than those of lower molecular weight. When compounds of low molecular weight, such as water, or hydrogen sulfide, are used, the amount of starter will generally not exceed 10 percent by weight of the total reactant mixture. In some instances involving starters of high equivalent weight, or polymers of low equivalent weight, the proportion of starter may exceed 50 percent by weight of the total reactant mixture. For example, if a low-molecular-weight polymer is formed by reacting an epoxide and an anhydride using stearyl alcohol as the starter, about 50 percent of the total polymer weight could be derived from the starter residue.

The amount of catalyst used may vary from a minimum of about 0.001% by weight of the reactant mixture to a maximum of about 30% by weight, and advisably from about 0.01 to 10% by weight, and preferably varies from about 0.01 to 5% by weight of the reactant mixture. The exact amount used will depend on the molecular weight of the particular catalysts selected, the catalyst's activity, the rate of the uncatalyzed reaction, and the desired rate to be achieved in the catalyzed reaction. Thus copolymerizations employing halogenated anhydrides which proceed without catalyst at a good rate require considerably smaller amounts of the catalyst, than copolymerizations which use unsubstituted aliphatic anhydrides as reactants, which latter copolymerizations are normally relatively slow. Likewise very active preferred catalysts such as stannous octoate will be effective at very low concentrations.

A valuable embodiment of the process of the present invention contemplates the preparation of polyether-ester copolymers which differ slightly from the random polyether-ester compositions obtained by the process described above. These novel compositions carry hydroxyl end groups and are composed of polyether-ester polymer chains which are terminated by polyether segments of increased length compared to that normally obtained, with the average number of oxyalkylene units in the terminal polyether segments being increased by a minimum value of at least 0.2. In compositions of this type an additional oxyalkylene unit is added to at least 20% of the polymer chains. The degree of polymerization in the terminal polyoxyalkylene tail segments of such compositions is at least 1, and advisably at least about 2, and frequently at least about 3. The length of the terminal polyoxyalkylene chain segment is theoretically unlimited, but for practical reasons, generally amounts to less than about 100 oxyalkylene units, and advisably less than 50 oxyalkylene units per chain-end segment, that is the degree of polymerization in the terminal ether segment is generally not more than 100 and advisably is less than 50. Compositions of this type could be described as polyether end-capped polyether-ester copolymers, or if the terminal ether segment is of sizable length as polyether-ester—polyether block copolymers, since such compositions are composed of a polyether-ester block and a polyether block.

Such terminally modified novel polymer compositions are obtained by reacting a random polyether-ester copolymer with a terminal lower aliphatic epoxide in the presence of a catalyst chosen from the class of the specific catalysts described herein. The ether end-capping process may be conveniently performed by preparing a random polyether-ester copolymer from a polymerization starter, a cyclic monoether and a cyclic monoanhydride according to the process described in the copending applications listed herein, adding to the polyether-ester polymer so obtained one of the specific catalysts described herein in an amount as specified above, and charging the reactor vessel with the lower terminal epoxide, and heating these reactants at superatmospheric pressure and at a temperature of at least about 100° C. and generally not more than 200° C. The total overall mol ratio of cyclic monoether to cyclic monoanhydride employed to prepare such ether end-capped polymeric compositions may be as high as twenty, and may sometimes be as high as fifty. Higher ratios may be used if very long terminal polyoxyalkylene blocks are desired. The amount of cyclic ether used to form the terminal polyoxyalkylene blocks is generally at least an average of about 0.2 mol per polymer chain end, and is seldom more than about 100 mols per chain end.

The process of the present invention utilizes only monoepoxides and monoanhydrides as reactants, and the degree of functionality of the polyether-ester copolymer is the same as that of the polymerization starter, and the final molecular weight of the polymer, and the nature of end groups of the polymer is determined by the ratio of cyclic ether to anhydride present in the reaction mixture. Specifically, the number of polymer molecules formed is the same as the number of starter molecules employed, and the number of end groups present in each polymer molecule is equal to the number of reactive functional groups of the original polymerization starter. The molecular weight and equivalent weight of the resultant polymer are thus easily calculated. The nature of the end groups of the copolymer is primarily determined by the ratio of epoxide to anhydride present in the reaction mixture. The end groups are preponderantly hydroxyl groups when a ratio of epoxide to anhydride in excess of about 2.5 is used, and ratios of about 1.5 up to 1.7 result in a copolymer having predominantly carboxylic acid end groups. If a polyfunctional starter is used, the copolymer molecule has the same number of chains as the number of reactive functional groups present in the starter, and the polymer chains radiate outward from and are attached to the residue of the starter compound. Thus the polymerization starter provides a core from which the polymer chains emanate in branch-like fashion.

The polyether-ester polymeric compositions may be monofunctional, or they may be polyfunctional, that is they may have one or several functional end groups. Specifically the functionality of the polymer will be the same as that of the polymerization starter employed in its formation. The polymer functionality, the nature of the functional end groups, the polymer molecular weight, and the polymer equivalent weight, that is the molecular weight per chain end, can be readily controlled as desired, by selecting the appropriate polymerization starter and the proportions of cyclic ether to anhydride and the total amount of each.

The present invention allows preparation of polyester-ether copolymers the molecular weight and the number of functional end groups of which can be selected from a wide range, depending on the choice of reactants and their proportions. If monomeric alcohols are used as polymerization starters the polymeric products have a functionality of unity. Many polymers of interest will desirably have a functionality of at least two and generally not more than eight, although higher functionalities are available by appropriate choice of the starter. The molecular weight per chain end, that is, the polymer equivalent weight, will vary from a minimum of about 100 to a maximum of about 5000 and sometimes to a maximum of about 10,000. The total polymer molecular weight is calculated by multiplying the molecular weight per chain end by the number of chains per molecule.

The minimum molecular weight of the polyester-ether copolymers of this invention will be at least 300, and preferably at least 500. Although there is no theoretical upper limit to the polymer molecular weights which can be obtained in practice, molecular weights will generally not exceed 100,000, and frequently will be less that 20,000. The polymeric compositions are further characterized by having a molecular-weight distribution characteristic of ring-opening polymerizations, with the difference in molecular weight between individual polymer molecules being relatively small, that is by having a narrow molecular-weight distribution.

In addition to accelerating the rate of polymerization and thereby allowing operation at lower temperature and pressures which results in considerable saving in equipment investment, the process of the present invention also has other advantages. The mild conditions of the process of this invention lead to significant improvement in polymer color. For example, polyether-ester copolymers prepared from unsaturated aliphatic anhydrides, such as maleic anhydride, are virtually colorless when prepared by the process of the present invention. In particular it has been noted that the use of catalysts derived from zinc, and also the catalyst dibutyltindilaurate, is particularly advantageous in preparing colorless or nearly colorless products. In another aspect the use of catalysts derived from boron can impart desirable flame-retarding features to the respective copolymeric compositions.

The use of the specific catalysts described by the present invention allows the preparation of polyether-ester copolymers having viscosities at 25° C. of less than 500,000 centipoises, and generally less than 200,000 centipoises and frequently less than 100,000 centipoises not only from aliphatic anhydrides but also from anhydrides containing stiff, bulky cyclic hydrocarbon radicals, such as phthalic anhydride or tetrachlorophthalic anhydride. Polyether-ester copolymers containing non-flexible stiff chain members, such as cyclic hydrocarbon rings or double bonds, and also possessing polyoxyalkylene segments of an average degree of polymerization of at least 2.5, and preferably at least 3.0, or possessing terminal polyether segments of sufficient length exhibit viscosities which are substantially reduced compared to compositions of lower average degree of polymerization in the polyoxyalkylene segments. The reduction in viscosity may amount to only as much as about 10 percent if the increase in the average degree of polymerization is small, such as about 0.2, but generally the decrease in viscosity will be at least 50 percent, and may be as much as 90 percent, as the average length of the polyoxyalkylene ether segments increases.

For example an increase of about 5 to 10 percent by weight of additional oxyalkylene residues in a polymer chain having a large proportion of stiff nonflexible radicals in the chain backbone will result in a severalfold reduction in viscosity. In general, reduction in viscosity by a factor of two to ten has been observed as the average degree of polymerization in the polyether segments increases by 0.5 to 1.0, e.g. from 2.5 to 3.0–3.5. It has also been noted quite surprisingly and inexplicably that the decrease in viscosity with temperature of these compositions becomes smaller as the average degree of polymerization in the polyether segments is increased.

Compositions prepared using these specific catalysts also exhibit excellent compatibility and miscibility with many other organic compounds.

The novel compositions prepared by the process of the present invention are light-colored, thermoplastic polymers of moderate or low viscosity which contain both ester and ether linkages in substantial and random proportion. They are thermoplastic, soluble, fusible polymers and retain these physical properties on prolonged heating at elevated temperature, that is these polymers are incurable by the mere application of heat alone in sharp contrast to the fluid heat-curable thermosetting intermediates which are encountered in the cross-linking of epoxy resins with cyclic anhydrides in the presence of alcohols. They are distinguishable from ordinary condensation polymers by their relatively narrow molecular-weight distribution and by the fact that the hydrolysis products resulting from ester cleavage under mild conditions contain a mixture of linear polyether glycols comprises of substantial quantities of mono-, di-, tri-, and tetraalkylene glycols and lesser quantities of penta- and higher glycols. In addition a very characteristic property of these polymers is that if a polyol starter is used it is not recovered on hydrolysis but is found to have been converted to a mixture of ethers containing residues of the epoxide or other cyclic ether employed. For example, if the polyester-ether copolymer made from phthalic anhydride, propylene oxide and glycerol is hydrolysed, propylene glycol, di-, tri-, and tetra- and higher propylene glycols are produced, and in addition to a small amount of recoverable glycerol, a substantial quantity of mono-, di-, and tri- and higher propylene oxide ethers of glycerol is also recovered.

The present compositions are characterized by having polymer chains composed essentially of polyoxyalkylene segments of randomly varying length separated from each other by ester units, said polymer chains being terminated at one end by hydroxyl or carboxyl groups and being attached at the other chain end through ester and ether linkages to a residue derived from a polymerization starter which carried functional groups selected from the class of hydroxyl, carboxyl and sulfhydryl groups, which functional groups reacted to form said polymer chains. The polyether-ester copolymer chains are essentially composed of (A) polyoxyalkylene segments of the type

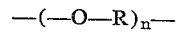

and (B) ester group of the type

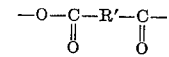

with said A and B members forming one or recurring sequences of the unit

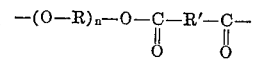

wherein R, R', and $n$ have the previously assigned meaning. The molar ratio of chemically combined R and R', $R/R'$, will vary in said compositions from about 2 to about ten, and the amount of starter residue from about 0.1 percent to about 50 percent by weight of the total weight of the polymer. In the hydroxyl-terminated polyether end-capped compositions the ratio of $R/R'$ will range from about 3.0 to as high as 50, and the proportion of starter residue may be somewhat reduced correspondingly.

The novel polyether-ester copolymers provided through the specific catalysts in the general process of the present invention can be represented by the general structural formula:

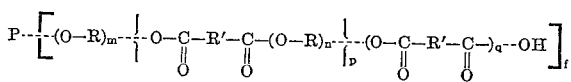

wherein P is the residue of a polymerization starter having a functionality $f$, $m$ is an integer varying from zero to generally no more than ten when the starter is selected from the group containing hydroxyl and sulfhydryl groups, and varying from one to generally not more than ten when the starter is selected from the group containing carboxylic acid groups, $n$ is an integer ranging from one to more than ten, with the arithmetic average value of $n$ being at least about 2.5, and frequently at least 3.0 and generally not more than eight, $p$ is the number of repeating polyester-ether units in the polymer chain, and is an integer ranging from zero to about 100 with the average value of $p$ being such that it results in a polymer equivalent weight of at least 100 and generally not more than 10,000, and $q$ is an integer having a value of one for a carboxyl-terminated polymer chain and of zero for a hydroxyl-terminated polymer chain, O—R is an oxyalkylene radical selected from the group consisting of 1,3-oxyalkylene radicals and 1,4-oxyalkylene radicals having from 2 to 12 carbon atoms, and R' is a hydrocarbon radical having from 2 to 12 carbon atoms and from 0 to 6 halogen atoms selected from chloro and bromo radical substituents and is identical with the R' in a cyclic monoanhydride of the structure

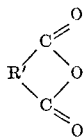

When non-specific catalysts are used, the values of $n$ will generally tend to range from about one to not more than six, with the average values of $n$ ranging from about 1.5 and frequently from 2.0 to about four, unless very large excess amounts of cyclic monoether and undesirably prolonged reaction times are employed. The average value of $n$ frequently referred to herein is computed by adding the total number of oxyalkylene units in all polyether segments and dividing the sum by the number of segments.

Novel completely hydroxyl-terminated polyether-ester copolymers having terminal polyether segments of increased length prepared according to the modified process embodiment of the present invention will have the general structural formula:

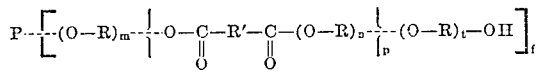

wherein P, $f$, R, R', $m$, $n$, and $p$, have the above-assigned meaning, and $t$ represents the additional number of oxyalkylene radicals in the hydroxyl-terminated polyoxyalkylene segment added in the end-capping process. The average value of $t$ will be at least 0.2 and will generally be no more than fifty.

The preferred polyether-ester polymer compositions are those in which R is a lower 1,2-alkylene radical of from two to six carbon atoms selected from the group consisting of 1,2-ethylene, 1,2-propylene, 1,2-butylene and 3-chloro-1,2-propylene and R' is a hydrocarbon radical having from two to twelve carbon atoms and from zero to six chloro or bromo atoms and is selected from the group consisting of 1,2-phenylene, 3,4,5,6-tetrachlorophenylene, 3,4,5,6-tetrabromophenylene, 2,2'-biphenylene, 1,4,5,6,7,7-hexachlorobicyclo - (2,2,1)-2,3-heptenylene-5, 1,2-ethylene, 1,2-ethenylene and chloro-1,2-ethenylene.

The polyether-ester copolymers prepared by the process of the present invention have a wide variety of uses. They are valuable as polymeric plasticizers, and they also have great utility as components in the formation of a wide variety of cross-linked compositions such as foams, castings and laminated products. For example, they can be reacted with polyisocyanates to form useful polyurethane compositions. Copolymers having ethylenic unsaturation, such as those derived from maleic anhydride, can be cross linked with ethylenically unsaturated monomers, such as styrene, using free-radical catalysts to form valuable castings and laminates.

The following examples are given to illustrate the invention and the advantageous results to be obtained thereby:

Example 1

In a closed vessel there is combined 1 part succinic anhydride by weight, 2.33 parts of propylene oxide by weight and 0.046 part by weight of a 50% solution of NaOH in water. The vessel is heated at 70° C., with agitation, for 25 hours. At the end of this time the reaction is incomplete, as evidenced by the crystallizing out of anhydride on cooling. The vessel is then further heated for 23 hours at 70° C. At the end of this time, the vessel is opened and the excess propylene oxide is driven off the resultant viscous polymer by heating. The weight loss of excess propylene oxide is 1.7 parts by weight, indicating that 0.63 part by weight of propylene oxide have become combined, and thus that the degree of polymerization of the epoxide in the form of polyoxyalkylene linkages is about 1.1 at most.

This experiment is repeated with 1.26 parts by weight of propylene oxide, and 0.020 part by weight of 50% NaOH per part of succinic anhydride. After heating at 70–85° C. for 11 hours, with agitation, only about ½ of the anhydride has dissolved, much propylene oxide remains unreacted, and the resulting fluid layer has very low viscosity, thus indicating that polymerization is very slow and incomplete.

This experiment is again repeated using 1.48 parts by weight of phthalic anhydride in place of the succinic anhydride. A voluminous precipitate is rapidly formed, and this precipitate does not dissolve, even on prolonged heating. Further, the supernatant fluid above the precipitate fails to become viscous, indicating that polymerization does not take place.

Example 2

A mixture of 0.35 g. of trimethylolpropane, 1.5 g. of maleic anhydride, 1.75 g. of propylene oxide and 0.35 g. of trimethyl borate is sealed into a heavy-walled glass tube and mixed well. The tube is then heated at 100° C. for 20 minutes and at 110° C. for an additional 60 minutes. The product is a pale yellow fluid which is viscous at oven temperature, and very viscous at room temperature. Without the borate catalyst the polymerization required eight hours at 160 C.

Example 3

A mixture of 3.9 g. of maleic anhydride, 4.1 g. of propylene oxide, 0.9 g. of glycerol and 1.1 g. of trimethyl borate is sealed in a heavy-walled glass tube. The tube is heated at 120° C. for three hours. The product is a pale yellow, viscous fluid.

Example 4

A mixture of 4.5 g. of maleic anhydride, 5.0 g. of propylene oxide, 0.8 g. of propylene glycol, and 1.5 g. of triallyl borate is sealed in a heavy-walled glass tube. The tube is heated at 120° C. for three hours. The product is a pale yellow, viscous fluid.

To 6.3 g. of the above polymer in a one-ounce widemouth glass jar is added 3.1 g. of styrene and 0.2 g. of benzoyl peroxide. The mixture is heated on a hotplate, and stirred until homogeneous. Then the glass jar is covered and heated at 80° C. in an oven for two hours. The product is a moderately flexible, tough casting which exhibits a lower degree of flammability than ordinary unsaturated polyester castings.

If 3.4 g. of tetrabromophthalic anhydride is substituted in place of 1.0 g. of the maleic anhydride in the production of the unsaturated polymer, and the resulting product is cured in the same fashion, a nearly fire-retardant casting results.

Example 5

In order to investigate partial esters of boric acid as catalysts, 1.1 g. of trimethyl borate and 0.15 g. of water are mixed to effect partial hydrolysis. This mixture is sealed together with 5.5 g. of 1,2-butylene oxide, 1.3 g. of glycerol and 5.0 g. of phthalic anhydride into a heavy-walled glass tube. The tube is then heated at 100° C. for two hours. The product is a glass-clear, viscous fluid when cooled to room temperature.

Example 6

A mixture of 0.35 g. of trimethylolpropane, 1.9 g. of maleic anhydride, 2.55 g. of propylene oxide and 0.45 g. of tricresyl borate is placed in a heavy-walled glass tube. The tube is sealed, and then heated at 90° C. for 30 minutes, and then at 100° C. for 20 minutes, 110° C. for 20 minutes, and finally at 120° C. for 10 minutes. The product has a golden brown color and is very viscous. Some propylene oxide is still present at the end of the run.

Example 7

A mixture of 0.55 g. of trimethylolpropane, 2.6 g. of phthalic anhydride, 2.85 g. of propylene oxide and 0.1 g. of triacetyl borate is combined in a heavy-walled glass tube which is then sealed. The tube is then heated at 90° C. for 55 minutes. The hot reaction product has a substantial viscosity. On cooling, condensation of a small amount of unreacted propylene oxide on the glass walls of the tube is noted. The cooled reaction product has a very high viscosity.

In the above example, 4.9 g. of diphenic anhydride is substituted for the phthalic anhydride, with the result that the product is of extremely high viscosity. Similarly, 4.8 g. of tetrachlorophthalic anhydride may be substituted for the phthalic anhydride, again giving an extremely high viscosity.

Example 8

Into a heavy-walled glass tube are weighed 0.5 g. of 1,2,6-hexanetriol, 3.05 g. of phthalic anhydride, 3.25 g. of propylene oxide and 0.3 g. of stannous octoate, and the tube is then sealed. The sealed tube is heated at 100° C. with occasional shaking, for 50 minutes. The reaction is complete after this time and no unreacted epoxide is present.

Example 9

In a heavy-walled glass tube 0.5 g. of pentaerythritol, 2.6 g. of phthalic anhydride, 0.21 g. of zirconium acetylacetonate and 2.9 g. of propylene oxide are combined, and the tube is sealed. The sealed tube is heated at 100° C., with occasional shaking, for 50 minutes. After this length of time only a small amount of reaction has taken place. The temperature is raised to 125° C. and the sealed tube is kept at this temperature for two more hours. At the end of this time the reaction is complete. The product is highly viscous and there is no unreacted propylene oxide left.

Example 10

In a heavy-walled glass vessel are combined 0.55 g. of trimethylolpropane, 2.6 g. of phthalic anhydride, 0.2 g. of dibutyltin dilaurate and 2.9 g. of propylene oxide, and the vessel is sealed. The reaction mixture is heated under autogeneous pressure at 100° C., with occasional shaking, for 105 minutes. At the end of this time the reaction is nearly complete. The reaction is completed by reheating the reaction mixture at 110° C. for three hours. The product is highly viscous, absolutely colorless and glass-clear.

Example 11

A mixture of 0.5 g. of trimethylolpropane, 2.55 g. of phthalic anhydride, 0.25 g. of a 6% solution of cobalt octoate in xylene, and 2.65 g. of propylene oxide is sealed into a heavy-walled glass tube, which is then heated at 100° C. for 105 minutes. At the end of this time the reaction product has a deep blue color and a very high viscosity. A small amount of condensate is noted on cooling the reaction mixture, indicating that the reaction is almost, but not quite, complete.

Example 12

Into a heavy-walled glass tube are weighed 0.35 g. of trimethylolpropane, 1.7 g. of phthalic anhydride, 0.2 g. of technical grade tetraisopropyl titanate, and 1.9 g. of propylene oxide and the tube is sealed. The sealed tube is heated, with occasional shaking, at 95° C. for 30 minutes. The reaction mixture is moderately viscous after this time but the reaction does not appear to be entirely complete. The reaction is completed by an additional 30-minute period of heating at 100° C., as judged by the very high viscosity of the reaction mixture and the lack of any condensate of unreacted propylene oxide.

This example is repeated, with essentially identical results, using 2.35 g. of 1,2-butylene oxide in place of the 1.9 g. of propylene oxide.

This example is again repeated, using 1.8 g. of ethylene oxide in place of the propylene oxide. In this case, the resulting polymer is substantially lower in viscosity than the polymer resulting from the use of propylene oxide.

Example 13

In a heavy-walled glass tube, 0.55 g. of trimethylolpropane, 2.3 g. of phthalic anhydride, 0.02 g. of powdered aluminum isopropylate, and 2.9 g. of propylene oxide are combined, and the tube is sealed. The sealed tube is heated at 120° C., with frequent shaking, for two hours, the resultant product being a colorless, viscous liquid. No indication of any condensate of unreacted propylene oxide is noted on cooling the reaction mixture.

Example 14

A mixture of 0.6 g. of trimethylolpropane, 2.6 g. of phthalic anhydride, 0.3 g. of a 8% solution of zinc octoate in xylene, and 2.55 g. of propylene oxide is sealed into a heavy-walled glass tube. The sealed tube is heated at 100° C. for 33 minutes with occasional shaking. At the end of this time the reaction mixture is quite viscous, and only a small amount of unreacted propylene oxide is evident on cooling. The reaction is completed by reheating the contents of the sealed tube for 45 minutes at 100° C.

Example 15

Into a heavy-walled glass tube are weighed 0.6 g. of sorbitol, 2.6 g. of phthalic anhydride, 0.1 g. of vinylcyclohexene dioxide, 2.7 g. of propylene oxide and 0.05 g. of stannous octoate and the tube is sealed. The sealed tube is heated, with frequent shaking, at 140° C. for two hours. The product is a very pale yellow, viscous fluid.

Example 16

Into a heavy-walled glass tube are weighed 0.3 g. of powdered lactose monohydrate, 2.3 g. of phthalic anhydride, 2.5 g. of propylene oxide, and 0.05 g. of dibutyltin dilaurate, and the tube is sealed. The sealed tube is heated at 145° C. for three hours with frequent shaking until the powder has dissolved. The product is a yellowish, very viscous fluid.

This example is repeated using citric acid in place of the lactose hydrate. The product is very similar, except that the viscosity is not quite so high.

Example 17

In a heavy-walled glass tube, 0.5 g. of glycerol, 7.6 g. of chlorendic anhydride, 3.6 g. of 1,2-butylene oxide, and 0.3 g. of a 10% solution of lead octoate in xylene are combined and the tube is sealed. The tube is then heated, with frequent shaking, at 150° C. for 3 hours. The product is an extremely viscous, brown, fluid.

Example 18

In a heavy-walled glass tube, 0.6 g. of catechol, 2.6 g. of phthalic anhydride, 2.9 g. of propylene oxide, and 0.1 g. of stannous octoate are combined and the tube is sealed. The tube is then heated at 150° C. for 2 hours, with occasional shaking. The resulting product is a pale yellow, very viscous fluid.

Example 19

A mixture of 0.3 g. of trimethylolpropane, 1.95 g. of phthalic anhydride, 2.15 g. of propylene oxide and 0.35 g.

of trimethyl borate is sealed into a heavy-walled glass tube and heated at 90° C. for 40 minutes and at 100° C. for an additional 100 minutes. The product is a glass-clear, viscous fluid at room temperature, and determination of the hydroxyl and acid number shows the reaction to be substantially complete. In a reference run using the same components without the trimethyl borate the polymerization required three hours at 160° C. to proceed to completion.

Example 20

Seventy-two g. of technical linoleic acid, 296 g. of maleic anhydride, 448 g. of propylene oxide, and 1.35 g. of stannous octoate are combined in a 1-liter 316 stainless steel pressure vessel. The vessel is then closed and sealed and the mixture heated to 80° C., with stirring. An exotherm then develops, raising the temperature to a maximum of 220° C., and then the temperature quickly drops. The product has a medium amber color, and has a viscosity of about 300,000 centipoises at 25° C.

Example 21

In a heavy-walled glass tube, 0.45 g. of lauryl mercaptan, 2.4 g. of phthalic anhydride, 2.6 g. of propylene oxide, and 0.1 g. of trimethyl borate are combined, and the tube is sealed. The sealed tube is then heated at 110° C. for two hours, with intermittent shaking. The product is a moderately viscous fluid.

Example 22

Sixty g. of superfine granular sucrose, 94 g. of 99.5% glycerol, 202 g. of phthalic anhydride, 475 g. of propylene oxide and 1.2 g. of stannous octoate are combined in a 1-liter 316 stainless steel pressure vessel. The vessel is then closed and sealed and heated to 285° F. with stirring, and maintained at 285° F. for 1 hour. The unreacted propylene oxide remaining is vented, and the product recovered. The product is orange in color, and has a viscosity of about 25,000 centipoises when cold, compared to a viscosity of several hundred thousand centipoises for a similar run made without stannous octoate.

Example 23

This example illustrates the preparation in a two-stage process of a polyester-ether copolymer having terminal polyether blocks of sizable length.

In the first step, 141 g. of anhydrous dextrose, 200 g. of phthalic anhydride, 49 g. of 99.5% glycerol, and 500 g. of propylene oxide are reacted in a 1-liter 316 stainless steel autoclave at 280° F., with stirring, for a period of 4 hours. The maximum pressure reached is about 130 p.s.i.g. After venting the excess propylene oxide, one-half of the product is removed from the vessel. The color is very pale (about Gardner 1 or 2), and the viscosity is 93,000 centipoises at 25° C. and 256 centipoises at 86° C.

In the second step, 0.45 g. of stannous octoate and 105 g. of propylene oxide are added to the remaining product and the mixture is reacted at 270° F. for 2 hours. Nearly all of the propylene oxide becomes combined. The product is of medium amber color, and very fluid. The polyether end-capped copolymer has a viscosity of 35,500 centipoises at 25° C. and 163 centipoises at 86° C.

Example 24

To a 1-liter 316 stainless steel autoclave is added 143 g. of anhydrous dextrose, 200 g. of phthalic anhydride, 50 g. of 99.5% glycerol, and 537 g. of propylene oxide. The mixture is reacted, with stirring, at 285° F. for 2 hr. and 15 min. A small amount of propylene oxide remains unreacted and is vented. The polymeric product is dark amber in color, is very fluid when hot, and has a viscosity of 40,600 centipoises at 25° C. and 154 centipoises at 86° C.

Example 25

This example again illustrates the preparation of a polyester-ether polyol end-capped with a polyether chain.

To a 1-liter 316 stainless steel autoclave is added 178 g. of anhydrous dextrose, 256 g. of phthalic anhydride, and 505 g. of propylene oxide. The contents are reacted at 280° F. for about 8 hours, with stirring. The maximum pressure reached is in the vicinity of 130 p.s.i.g. The product has a color of about Gardner 5 or 6. Its viscosity is of the order of several million centipoises at room temperature.

To about 300 g. of this polymeric product is added 125 g. of propylene oxide and 0.25 g. of stannous octoate, and the mixture reacted at 285° F. for 2½ hours. In this time the pressure drops steadily from 122 p.s.i.g. to 72 p.s.i.g. The end-capped polymer is amber and has a viscosity of 1,060,000 centipoises at 25° C.

Example 26

In a 1-liter 316 stainless steel pressure vessel are reacted 160 g. of anhydrous dextrose, 241 g. of phthalic anhydride, 540 g. of propylene oxide and 0.40 g. of 8% zinc octoate. The reaction is run at 280–290° F. for 4½ hours. The maximum pressure reached is 157 p.s.i.g. and the final pressure is about 100 p.s.i.g.

The product has a color of about Gardner 5, and has a viscosity of several hundred thousand centipoises at 25° C.

Example 27

In a heavy-walled glass tube are combined 0.35 g. of ethylene glycol, 2.8 g. of phthalic anhydride, 3.7 g. of trimethylene oxide (oxetane), and 0.1 g. of stannous octoate. The tube is then sealed and is heated at 140° C., with intermittent shaking, for 3 hours. At the end of this time the reaction appears complete, and the product is a pale yellow, viscous fluid.

This experiment is repeated, using 7.0 g. of 3,3-bis (chloromethyl) oxetane in place of the trimethylene oxide. The resulting product is quite a bit darker in color, and much more viscous.

Examples 28–80

The procedure described below was used for the experiments described in the following tables. In these tables are set forth the reactants and catalyst employed and the amount of each as well as the average degree of polymerization in the polyether segments of the resulting polyester-ether copolymer.

The dicarboxylic acid anhydride, the epoxide, the polymerization starter and the catalyst are weighed into a heavy-walled glass tube. The tube is sealed off and placed into an oven at 150° C. The sealed tube is shaken intermittently for a period of about 30 minutes to one hour until the contents have become homogeneous, and the tube is then held at a temperature of 150° C. for a period of about 24 hours. A viscous thermoplastic polymer is formed. After the polymerization is completed, the tube is cooled and the amount of any unreacted excess epoxide is determined. The tip of the glass tube containing the cooled reaction mixture is broken, and the total weight of the tube plus contents is determined. The opened tube is then heated at 70° C. until the total weight reaches a constant value. The weight loss at 70° C. obtained in this manner is taken to represent the chemically uncombined epoxide.

For the runs described in Table I, 0.98 part by weight of maleic anhydride and 2.33 parts by weight of propylene oxide were used in combination with the other components listed.

For the runs described in Table II, 1.48 parts by weight of phthalic anhydride and 2.33 parts by weight of propylene oxide were used in combination with the other components listed.

For the runs described in Table III, 1.00 part by weight of succinic anhydride were used in combination with the

TABLE I.—MALEIC ANHYDRIDE-PROPYLENE OXIDE

| Ex. No. | Starter, Parts by Weight | Catalyst, Parts by Weight | Degree of Polymerization in Ether Segments | Remarks |
|---|---|---|---|---|
| 28 | Water, 0.021 | Ferric acetylacetonate, 0.016 | 2.39 | Amber. |
| 29 | Water, 0.022 | Aluminum isopropylate, 0.030 | (1) | Gel. |
| 30 | Water, 0.024 | Tetraisopropyltitanate, 0.031 | 2.81 | |
| 31 | Water, 0.026 | Dibutyltin dilaurate, 0.021 | | Incomplete reaction. |
| 32 | Water, 0.026 | Stannous octoate, 0.023 | 3.34 | Pale, cloudy. |
| 33 | Water, 0.025 | 8% zinc octoate, 0.013 | 3.65 | Yellow. |
| 34 | Water, 0.021 | 6% cobalt octoate, 0.014 | 3.00 | Orange. |
| 35 | Water, 0.023 | V+++ acetylacetonate, 0.018 | 2.39 | Dark. |
| 36 | Water, 0.022 | 24% lead octoate, 0.014 | 2.22 | |
| 37 | Water, 0.021 | Nickel acetylacetonate, 0.022 | 3.08 | Amber |

1 About 2.5.

TABLE II.—PHTHALIC ANHYDRIDE-PROPYLENE OXIDE

| Ex. No. | Starter, Parts by Weight | Catalyst, Parts by Weight | Degree of Polymerization in Ether Segments | Remarks |
|---|---|---|---|---|
| 38 | Water, 0.024 | None | 2.52 | Very pale. |
| 39 | Water, 0.024 | Stannous octoate, 0.019 | 3.38 | Pale. |
| 40 | Water, 0.024 | Tetraisopropyl titanate, 0.013 | 2.45 | Do. |
| 41 | Water, 0.023 | Aluminum isopropylate, 0.017 | 3.25 | Cloudy. |
| 42 | Water, 0.022 | Zirconium acetylacetonate, 0.021 | 2.03 | |
| 43 | Water, 0.021 | Chromium acetylacetonate, 0.021 | 2.03 | Dark. |
| 44 | Water, 0.022 | VO acetylacetonate, 0.037 | 2.94 | Brown. |
| 45 | Water, 0.025 | Ferric acetylacetonate, 0.011 | 2.89 | Do. |
| 46 | Water, 0.023 | Zinc acetylacetinate, 0.023 | 3.68 | Orange. |
| 47 | Water, 0.025 | Nickel acetylacetonate, 0.021 | 3.32 | Amber. |
| 48 | Water, 0.022 | Aluminum acetylacetonate, 0.027 | 2.22 | |
| 49 | Water, 0.020 | Cobaltous acetylacetonate, 0.024 | 3.32 | Pale brown. |
| 50 | Water, 0.026 | Manganous acetylacetonate, 0.042 | 2.22 | Brown. |
| 51 | Water, 0.024 | Cobaltic acetylacetinate, 0.020 | 3.32 | Amber. |
| 52 | Water, 0.039 | Manganic acetylacetonate, 0.01 | 2.40 | |
| 53 | Water, 0.040 | V+++ acetylacetonate, 0.01 | 3.04 | |
| 54 | Water, 0.025 | Cupric acetylacetonate, 0.010 | 2.33 | |
| 55 | Water, 0.035 | 6% cobalt octoate, 0.052 | 3.40 | Do. |
| 56 | Water, 0.031 | 8% zinc octoate, 0.050 | high | Yellow, cloudy. |
| 57 | Water, 0.026 | Aluminum stearate, 0.022 | 2.52 | |
| 58 | Water, 0.031 | Ferric stearate, 0.010 | 2.67 | |
| 59 | Water, 0.025 | Trimethylborate, 0.046 | 2.70 | |
| 60 | Water, 0.022 | TiO acetylacetonate, 0.026 | 2.55 | |
| 61 | Dipropylene glycol, 0.063 | 8% zinc octoate, 0.013 | 3.70 | Pale yellow. |
| 62 | Water, 0.023 | Dibutyltin dilaurate, 0.017 | 2.74 | |

TABLE III.—SUCCINIC ANHYDRIDE-PROPYLENE OXIDE

| Example No. | Epoxide, Parts by Weight | Starter, Parts by Weight | Catalyst, Parts by Weight | Degree of Polymerization in Ether Segments | Remarks |
|---|---|---|---|---|---|
| 63 | 2.33 | Water, 0.024 | None | 2.57 | Very pale. |
| 64 | 2.33 | Water, 0.023 | 8% zinc octoate, 0.029 | 3.44 | Do. |
| 65 | 2.33 | Water, 0.024 | 6% cobalt octoate, 0.045 | 3.08 | |
| 66 | 2.33 | Water, 0.022 | Ferric acetylacetonate, 0.005 | 1.55 | |
| 67 | 2.33 | Water, 0.024 | Nickel acetylacetonate, 0.018 | 2.68 | |
| 68 | 2.33 | Water, 0.022 | Stannous octoate, 0.022 | 3.19 | Yellow. |
| 69 | 2.33 | Water, 0.032 | V+++ acetylacetonate, 0.028 | 3.29 | Dark. |
| 70 | 2.33 | Water, 0.021 | Aluminum isopropylate, 0.025 | 2.40 | Very pale. |
| 71 | 2.33 | Water, 0.024 | Tetraisopropyltitanate, 0.013 | 2.94 | Pale yellow. |
| 72 | 2.33 | Dipropylene glycol, 0.060 | Aluminum isopropylate, 0.035 | 2.14 | Gel. |
| 73 | 2.33 | Water, 0.022 | Tetraisopropyltitanate, 0.013 | 2.45 | |
| 74 | 2.33 | Water, 0.032 | Ferric acetylacetonate, 0.009 | 1.76 | |
| 75 | 2.33 | Dipropylene glycol, 0.064 | Nickel acetylacetonate, 0.017 | 2.20 | |
| 76 | 3.47 | Water, 0.023 | 8% zinc octoate, 0.029 | 4.22 | Very pale. |
| 77 | 2.33 | 85% phosphoric acid, 0.056 | None | 2.19 | |
| 78 | 2.33 | Water, 0.027 | Dibutyltindilaurate, 0.020 | | Incomplete reaction. |
| 79 | 2.33 | Water, 0.022 | 24% lead octoate, 0.020 | 2.19 | |
| 80 | 2.33 | Water, 0.023 | V+++ acetylacetonate, 0.001 | 2.15 | |

I claim:

1. The process of producing a fusible, soluble, thermoplastic polyether-ester copolymer having a molecular weight of at least 300 which comprises reacting together in a closed system at a temperature of about 30° C. to 200° C. sufficient for the reactants to polymerize and at a pressure at least equal to the vapor pressure of the system at the reaction temperature (1) a cyclic monoether selected from the group consisting of terminal epoxides and monooxetanes having up to 10 carbon atoms, (2) a cyclic monoanhydride of a dicarboxylic acid having from four to fourteen carbon atoms and from zero to six halogen substituents selected from the group consisting of chloro and bromo radicals, (3) from 0.1 to 50 percent by weight based on the weight of the total reactant mixture of a polymerization starter selected from the group consisting of water and aliphatic organic compounds having at least one radical of the class consisting of hydroxyl, carboxyl and sulfhydryl radicals, and combinations thereof, and (4) from 0.001 to 30 percent by weight based on the weight of the reactant mixture of a catalyst selected from the group consisting of inorganic esters of alcohols having from one to 18 carbon atoms, salts of carboxylic acids having from 2 to 54 carbon atoms and acetylacetonates of elements selected from the group consisting of aluminum, titanium, zirconium, boron, and antimony, with the mol ratio of said cyclic monoether to said cyclic anhydride being at least 1.50.

2. The process of claim 1 in which said cyclic monoether is a terminal lower aliphatic epoxide, and said monoanhydride is selected from the group consisting of phthalic anhydride, tetrachlorophthalic anhydride, tetrabromophthalic anhydride, chlorendic anhydride, tetrahydrophthalic anhydride, glutaric anhydride, succinic anhydride, and maleic anhydride.

3. The process of claim 2 in which said polymerization starter is an aliphatic alcohol having from one to 18 carbon atoms and from one to eight hydroxyl groups.

4. The process of claim 2 in which said polymerization starter is a saccharide selected from the group consisting of xylose, dextrose, sucrose, and alpha-methyl glucoside.

5. The process of claim 2 in which said polymerization starter is a carboxylic acid having from two to 54 carbon atoms, from one to four carboxyl groups and from zero to five hydroxy groups.

6. The process of claim 2 in which said catalyst is a tetra-(lower alkyl) titanate.

7. The process of claim 2 in which said catalyst is a tri-(lower alkyl) aluminate.

8. The process of claim 2 in which said catalyst is a tri-(lower alkyl) borate.

9. The process of producing a fusible, soluble, thermoplastic polyether-ester copolymer having a molecular weight of at least 300 which comprises reacting together in a closed system at a temperature of about 30° C. to 200° C. sufficient for the reactants to polymerize and at a pressure at least equal to the vapor pressure of the system at the reaction temperature (1) a cyclic monoether selected from the group consisting of terminal epoxides and monooxetanes having up to 10 carbon atoms, (2) a cyclic monoanhydride of a dicarboxylic acid having from four to fourteen carbon atoms and from zero to six halogen substituents selectedf rom the group consisting of chloro and bromo radicals, (3) from 0.1 to 50 percent by weight based on the weight of the total reactant mixture of a polymerization starter selected from the group consisting of water, hydrogen sulfide and organic compounds having at least one radical of the class consisting of hydroxyl, carboxyl and sulfhydryl radicals, and combinations thereof, and (4) from 0.001 to 10 percent by weight of the reactant mixture of a catalyst selected from the group consisting of salts of carboxylic acids having from two to 54 carbon atoms and acetylacetonates of tin, zinc, cobalt, nickel and vanadium, with the mol ratio of said cyclic monoether to said cyclic monoanhydride being at least 2.5.

10. The process of claim 9 in which said cyclic monoether is a terminal lower aliphatic epoxide, and said monoanhydride is selected from the group consisting of phthalic anhydride, tetrachlorophthalic anhydride, tetrabromophthalic anyhdride, chlorendic anhydride, tetrahydrophhalic anhydride, glutaric anhydride, succinic anhydride, and maleic anhydride.

11. The process of claim 10 in which said polymerization starter is an aliphatic alcohol having from one to 18 carbon atoms and from one to eight hydroxyl groups.

12. The process of claim 10 in which said polymerization starter is a saccharide selected from the group consisting of xylose, dextrose, sucrose, and alpha-methyl glucoside.

13. The process of claim 10 in which said polymerization starter is a carboxylic acid having from two to 54 carbon atoms, from one to four carboxyl groups and from zero to five hydroxyl groups.

14. The process of claim 10 in which said catalyst is a stannous alkanoate.

15. The process of producing a fusible, soluble, thermoplastic polyether-ester copolymer having a molecular weight of at least 300, which process comprises the following process steps:

(A) Reacting together, in intimate admixture, in a closed system, at superatmospheric pressure, and at a temperature of from about 70° C. up to about 200° C. for a sufficient length of time to effect polymerization (1) a cyclic monoether selected from the group consisting of terminal epoxides and mono-oxetanes having up to 10 carbon atoms, (2) a cyclic monoanhydride of a dicarboxylic acid having from four to fourteen carbon atoms and from zero to six halogen substituents selected from the group consisting of chloro and bromo radicals, (3) from 0.1 to 50 percent by weight based on the weight of the total reactant mixture of a polymerization starter selected from the group consisting of water, hydrogen sulfide and organic compounds having at least one radical of the class consisting of hydroxyl, carboxyl and sulfhydryl radicals, and combinations thereof, with the mol ratio of said cyclic monoether to said cyclic anhydride being at least 1.50, (B) Reacting together, in initmate admixture, in a closed system, at superatmospheric pressure, and at a temperature of from about 100° C. up to 200° C. for a sufficient length of time to effect polymerization (4) the product of step A, (5) from 0.2 to 50 mols per equivalent of terminal groups of the product of step A of a terminal monoepoxide having up to 10 carbon atoms, and (6) from 0.001 to 10 percent by weight of the reactant mixture of a catalyst selected from the group consisting of salts of carboxylic acids having from two to 54 carbon atoms and acetylacetonates of tin, zinc, cobalt, nickel and vanadium.

16. A soluble, fusible thermoplastic hydroxyl-terminated polyester-ether copolymer having a molecular weight of at least 300 and a viscosity at 25° C. ranging from about 1000 centipoises to not more than about 200,000 centipoises and having essentially the general formula:

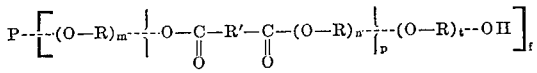

wherein P is the residue of a polymerization starter of functionality $f$ selected from the group consisting of water, and organic compounds having at least one radical of the class consisting of hydroxyl, carboxyl and sulfhydryl radicals, $m$ is an integer varying from zero to generally no more than ten when the starter is selected from the group containing hydroxyl and sulfhydryl groups, and varying from one to generally not more than ten when the starter is selected from the group containing carboxylic acid groups, $n$ is an integer ranging from one to more than ten, with the arithmetic average value of $n$ being at least about 2.5, $p$ is the number of repeating polyesterether units in the polymer chain, and is an integer ranging from zero to about 100 with the average value of $p$ being such that it results in a polymer equivalent weight of at least 100 and generally not more than 10,000, $t$ has a value of from 0 up to about 100, with an average value ranging from 0.2 to fifty, O—R is an oxyalkylene radical selected from the group consisting of 1,3-oxyalkylene radicals and 1,4-oxyalkylene radicals having from 2 to 12 carbon atoms, and R′ is a hydrocarbon radical having from 2 to 12 carbon atoms and from 0 to 6 halogen substituents selected from chloro and bromo radicals and is identical with the R′ in a cyclic monoanhydride of the structure

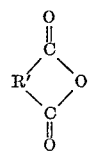

17. The composition of claim 16 wherein R is selected from the group consisting of 1,2-ethylene, 1,2-propylene and 1,2-butylene and R′ is selected from the group consisting of 1,2-phenylene, 3,4,5,6-tetrachloro-1,2-phenylene, 3,4,5,6--tetrabromo-1,2-phenylene, 3,4,5,6-tetrahydro-1,2-phenylene, 2,2′ - biphenylene, 1,4,5,6,7,7 - hexachlorobicyclo-(2,2,1)-2,3-heptenylene-5, 1,2-ethylene, 1,3-propylene, and 1,2-ethenylene.

18. The compositions of claim 17 wherein P is a residue of a polymerization starter selected from the group consisting of dextrose, xylose, sucrose, water, aliphatic alcohols having from 1 to 18 carbon atoms and from 1 to eight hydroxyl groups and carboxylic acids and hydroxy carboxylic acids having from two to 54 carbon atoms, from one to four carboxyl groups and from zero to five hydroxyl groups and aqueous mixtures thereof.

References Cited

UNITED STATES PATENTS

| 2,822,350 | 2/1958 | Hayes | 260—78.4 |
| 3,117,099 | 1/1964 | Proops | 260—2 |
| 2,870,101 | 1/1959 | Stewart | 260—2 |

JOSEPH L. SCHOFER, *Primary Examiner.*

J. KIGHT, *Assistant Examiner.*